C. F. PIKE.
TRAP FOR CATCHING PORPOISES.
APPLICATION FILED SEPT. 11, 1909.
972,230.
Patented Oct. 11, 1910.
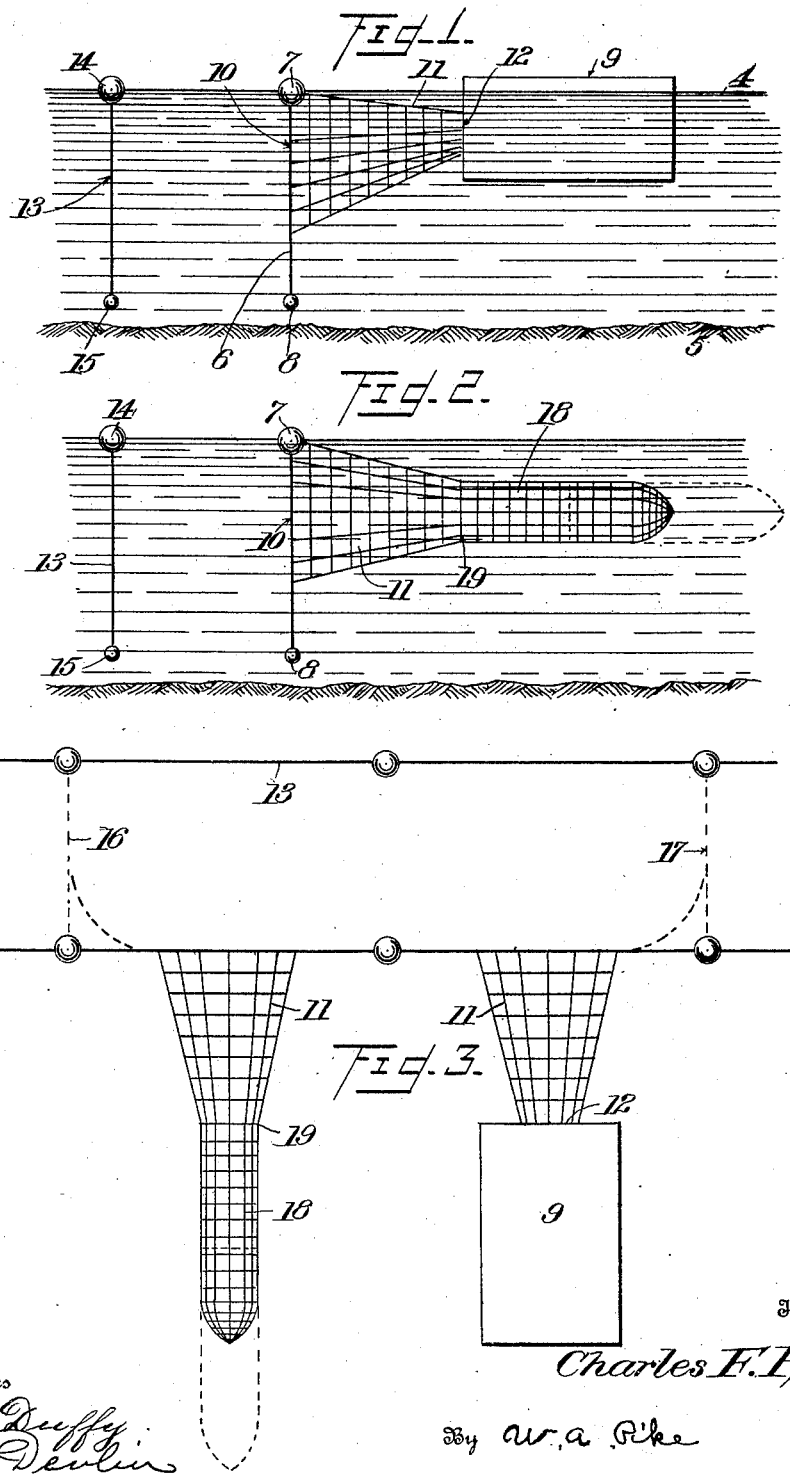

UNITED STATES PATENT OFFICE.

CHARLES F. PIKE, OF PHILADELPHIA, PENNSYLVANIA.

TRAP FOR CATCHING PORPOISES.

972,230.  Specification of Letters Patent.  Patented Oct. 11, 1910.

Application filed September 11, 1909. Serial No. 517,250.

*To all whom it may concern:*

Be it known that I, CHARLES F. PIKE, a citizen of the United States, residing at Philadelphia, in the county of Philadelphia and State of Pennsylvania, have invented certain new and useful Improvements in Traps for Catching Porpoises, (Case G,) of which the following is a specification.

My invention relates to devices for catching fish and especially for catching the porpoise.

In this art as heretofore developed means have been provided for this purpose which comprise in general terms obstructions, such as nets or seines, placed in the path traveled by the fish, and in the rear thereof receptacles with forward openings coinciding with openings in the obstructions, whereby the fish upon encountering the obstruction will pass through the opening therein into the receptacle in the rear thereof.

The porpoise generally swim near the surface of the water and while they will to some extent pass through the opening in the obstruction placed in their path, they will be very liable, when they meet an obstruction, to jump over it and thus be lost to the fisher.

The general object of my invention is to provide means whereby the fish will be caught after jumping over the obstruction and thus avoid the loss of such a large number as would occur in the use of the means now provided.

In traps for catching the porpoise by means of obstructions and receptacles placed into position to receive the porpoise after he jumps over the obstruction, there is a certain amount of danger that the fish will jump out of the receptacle, or that he will in his rush through the water injure the obstruction or the receptacle.

The special object of this invention is to provide a trap for catching the porpoise or other fish in which provision is made against the liability of the porpoise to jump out of the trap after he has jumped into it or to injure the obstruction or receptacle.

With this object in view, my invention consists in the improved construction, arrangement and combination of parts of a fish trap which will be hereinafter fully described and afterward specifically claimed.

I have illustrated an embodiment of my invention in the accompanying drawing, in which—

Figure 1 is a side elevation. Fig. 2 is a similar view showing a receptacle of slightly different form, and Fig. 3 is a top plan view, embodying the constructions of both Fig. 1 and Fig. 2.

Referring specifically to the drawing, 4 indicates the surface and 5 the bottom of a body of water in which the apparatus is to be operated.

An obstruction, in this instance an ordinary seine, is shown at 6 supported by float 7 of any ordinary kind at the surface of the water and held down by any ordinary weights or sinkers 8 at the bottom. At 9 is shown a receptacle in the form of a floating box or live box which is illustrated as of rectangular form in Fig. 1, although such form may be varied within reasonable limits. The obstruction 6 is provided with an opening at 10 and a conical net 11 is fitted to connect said opening with an opening 12 in the box 9. Parallel with and at a reasonable distance in advance of obstruction 7 is a similar obstruction 13 having floats 14 and sinkers 15, said obstruction being unbroken or uninterrupted by openings.

The porpoise approaching the first obstruction 13 will jump over it into the space between that obstruction and the second obstruction 7. He will find himself confined between the two obstructions and with his exit laterally prevented by obstructions of net or seine form connecting the two obstructions 13 and 7, as shown at 16 and 17 in Fig. 3. In endeavoring to escape he will be liable to swim through the opening 10 and net 11 into the box 9.

The distance between the two obstructions 14 and 7 will not be sufficient for the fish to gain headway enough to jump over either of them.

In the form shown in Fig. 2, a receptacle 18 is removably connected at 19 with the net 11, this receptacle being substituted for the box 9 of Fig. 1. In either instance, the receptacle consisting of the box 9, or the net 18, may be detached from the conical end 11 and moved away therefrom, as indicated in dotted lines in Figs. 2 and 3.

Other forms of net and receptacles might be used without departing from my invention.

Having fully described my invention, what I claim as new and desire to secure by Letters Patent, is—

1. A device for catching porpoise, comprising two substantially parallel obstructions with an intervening space, the first obstruction being uninterrupted and the second provided with means for securing the porpoise, substantially as described.

2. A device for catching porpoise, comprising two substantially parallel obstructions with an intervening space, the first obstruction being uninterrupted and the second provided with an opening through which the fish may pass and a receptacle beyond the opening to receive the fish passing through the obstruction, substantially as described.

3. A device for catching porpoise, comprising two substantially parallel obstructions with an intervening space, the first obstruction being uninterrupted and the second provided with an opening, an entrance net fitted about said opening and a receptacle communicating with the outer end of the entrance net, substantially as described.

4. A device for catching porpoise, comprising two substantially parallel obstructions with an intervening space, the first obstruction being uninterrupted and the second provided with an opening, an entrance net fitted about said opening and a receptacle communicating with the outer end of the entrance net, said receptacle being removably attached to said entrance net, substantially as described.

5. A device for catching porpoise, comprising two substantially parallel obstructions with an intervening space, the first obstruction being uninterrupted and the second provided with means for securing the porpoise, and transverse obstructions connecting the two main obstructions and located on opposite sides of the means for securing the fish, substantially as described.

In testimony whereof I affix my signature in presence of two witnesses.

CHARLES F. PIKE.

Witnesses:
WM. A. PIKE,
JOHN DEVLIN.